United States Patent [19]
Fischer et al.

[11] 3,755,298

[45] Aug. 28, 1973

[54] SUBSTITUTED HEXAHYDROAZEPINECARBOXYLIC AMIDES

[75] Inventors: Adolf Fischer, Mutterstadt; Wolfgang Rohr, Mannheim; Walter-Wielant Wiersdorff, Ludwigshafen, Germany

[73] Assignee: Badische Anilin- & Soda-Fabrik Aktiengesellschaft, Land Rhineland-Pfalz, Germany

[22] Filed: May 12, 1971

[21] Appl. No.: 142,768

[30] Foreign Application Priority Data
June 9, 1970 Germany.................. P 20 28 168.9

[52] U.S. Cl. ............................. 260/239 BF, 71/88

[51] Int. Cl............................................ C07d 41/04
[58] Field of Search .............................. 260/239 BF

[56] References Cited
OTHER PUBLICATIONS
Rohr, Chem. Abstracts, Vol. 71, Abstract No. 12389-7w (1969). QD1A51.

*Primary Examiner*—Alton D. Rollins
*Attorney*—Johnston, Root, O'Keeffe, Keil, Thompson & Shurtleff

[57] ABSTRACT

New and valuable substituted hexahydro-1H-azepine-1-carboxylic amides having a good herbicidal action and a process for controlling the growth of unwanted plants with these compounds.

5 Claims, No Drawings

SUBSTITUTED HEXAHYDROAZEPINECARBOXYLIC AMIDES

The invention relates to new and valuable substituted methyl-hexahydro-1H-azepine-1-carboxylic amides for use as weedkillers and herbicides containing these compounds.

It is known to use N-m-trifluoromethylphenyl-N'-dimethylurea as a herbicide. However, its action is not satisfactory.

We have now found that hexahydro-1H-azepine-1-carboxylic aryl-amides of the formula

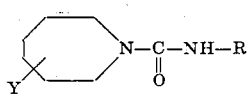

where R denotes phenyl which may bear, as substituents, one or more identical or different halogen atoms (fluorine, chlorine, bromine, iodine), haloalkyl (trifluoromethyl, chloromethyl), alkyl (methyl, ethyl), alkoxy (methoxy, ethoxy, allyloxy, propargyloxy), alkylmercapto (methylmercapto), alkylsulfonyl (methylsulfonyl) or cyano groups, and Y denotes methyl or hydrogen, have a good herbicical action. This action is particularly effective on grass weeds and millet types.

The new herbicides are suitable for controlling unwanted plants in crops such as cotton, Indian corn and cereals at application rates of 1 to 4 kg per hectare.

The new compounds may be prepared by reacting an aryl isocyanate with a methylhexahydro-1H-azepine. The active ingredients may also be obtained by allowing a methylhexahydro-1H-azepine in the form of its 1-acyl chloride to react with a suitable arylamine.

Methylhexahydro-1H-azepines are accessible for instance by reduction of the corresponding methylcaprolactams (cf. Amer. Chem. Soc., 76, 2317, 1954).

Examples of methylhexahydro-1H-azepines suitable for producing the active ingredients are as follows:
2-methylhexahydro-1H-azepine;
3-methylhexahydro-1H-azepine;
4-methylhexahydro-1H-azepine.

Mixtures containing the three individual structurally isomeric methylhexahydro-1H-azepines are also suitable. For instance, a methylhexahydro-1H-azepine isomer mixture is suitable which is obtained by reducing an isomer mixture of methylcaprolactam in turn obtained by photooximation of methylcyclohexane and subsequent Beckmann rearrangement.

EXAMPLE 1

Preparation of methylhexahydro-1H-azepine-1-carboxylic-m-methyl-phenylamide:

At room temperature (20°C), 13.3 parts (by weight) of m-methy-phenyl isocyanate was slowly added to a solution of 11.3 parts of an isomer mixture of methylhexahydro-1H-azepine in 200 parts of benzene. The mixture was then stirred for 2 hours at 40°C.

The benzene solution was washed with dilute hydrochloric acid and water, and dried. The product, after concentration in vacuo, melts at 86° to 88°C.

The following compounds as isomer mixtures may be prepared analogously:
methylhexahydro-1H-azepine-1-carboxylic-p-fluorophenylamide,
m.p. 108° to 110°C;
methylhexahydro-1-H-azepine-1-carboxylic-m-trifluoromethylphenyl-amide,
m.p. 84° to 85°C;
methylhexahydro-1H-azepine-1-carboxylic-3-chloro-4-bromophenyl-amide,
m.p. 141° to 142°C;
methylhexahydro-1H-azepine-1-carboxylic-3-chloro-4-methylmercapto-phenylamide;
methylhexahydro-1H-azepine-1-carboxylic-3-chloro-4-methoxyphenyl-amide, m.p. 104° to 105°C;
methylhexahydro-1H-azepine-1-carboxylic-3,4-dichlorophenylamide, m.p. 148° to 150°C.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e. g. tetrahydro-naphthalene or alkylated naphthalenes, or organic liquids having boiling points higher than 150°C and having one or more than one functional group, e. g., the keto troup, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g., kieselguhr, talc, clay or fertilizers.

The following examples demonstrate the use of the new active ingredients.

EXAMPLE 2

Loamy sandy soil was filled into pots and sown with Gossypium hirsutum, Poa annua, Poa trivialis, Echinochloa crus-galli, Lamium amplexicaule and Sinapis arvensis.

The soil prepared in this manner was immediately treated with 2 kg per hectare of an isomer mixture of methylhexahydro-1H-azepine-1-carboxylic-p-fluorophenylamide (I), with 2 kg per hectare of an isomer mixture of methylhexahydro-1H-azepine-1-carboxylic-m-methyl-phenylamide (II), with 2 kg per hectare of an isomer mixture of methylhexahydro-1H-azepine-1-carboxylic-m-trifluoromethylphenylamide (III) and, for comparison, with 2 kg per hectare of N-m-trifluoro-methylphenyl-N',N'-dimethylurea (IV), each active ingredient being dispersed in 500 liters of water per hectare.

After 4 to 5 weeks I, II and III had a stronger herbicidal action on weeds than IV, combined with the same good compatibility with Gossypium hirsutum.

The results of the experiment are given in the following table.

| Crop plant: | Active ingredient | | | |
|---|---|---|---|---|
| | I | II | III | IV |

| | | | | |
|---|---|---|---|---|
| Gossypium hirsutum | 0 | 0 | 0 | 0 |
| Unwanted plants: | | | | |
| Poa annua | 100 | 95 | 100 | 90 |
| Poa trivialis | 95 | 90 | 95 | 85 |
| Echinochloa crus-galli | 100 | 90 | 100 | 80 |
| Laminum amplexicaule | 100 | 95 | 100 | 90 |
| Sinapis arvensis | 100 | 95 | 100 | 90 |

0 = no damage
100 = complete destruction.

EXAMPLE 3

The plants Gossypium hirsutum, Digitaria sanguinalis, Echinochloa crus-galli, Poa annua, Poa trivialis and Lamium amplexicaule were treated at a growth height of 2 to 14 cm with 1.5 kg per hectare of an isomer mixture of methylhexahydro-1H-azepine-1-carboxylic-p-fluorophenylamide (I), with 1.5 kg per hectare of an isomer mixture of methylhexahydro-1H-azepine-1-carboxylic-m-methylphenylamide (II), with 1.5 kg per hectare of an isomer mixture of methylhexahydro-1H-azepine-1-carboxylic-m-trifluoromethyl-phenylamide (III) and, for comparison, with 1.5 kg per hectare of N-m-trifluoromethylphenyl-N',N'-dimethylurea (IV), each active ingredient being dispersed in 500 liters of water per hectare.

The results of the experiment after 4 weeks (considerable damage to Gossypium hirsutum by active ingredient IV) are given in the following table:

| | Active ingredient | | |
|---|---|---|---|
| | III | III | IV |
| Crop plant: | | | |
| Gossypium hirsutum | 05 | 5 | 20 |
| Unwanted plants: | | | |
| Digitaria sanguinalis | 100 | 95 | 95 | 85 |
| Echinochloa crus-galli | 100 | 95 | 100 | 90 |
| Poa annua | 100 | 95 | 95 | 80 |
| Poa trivialis | 100 | 100 | 95 | 80 |
| Lamium amplexicaule | 100 | 100 | 100 | 100 |

0 = no damage
100 = complete destruction.

The action of the following compounds corresponds to that of I, II and III:
methylhexahydro-1H-azepine-1-carboxylic-3-chloro-4-methylmercapto-phenylamide;
methylhexahydro-1H-azepine-1-carboxylic-3-chloro-4-methoxyphenyl-amide;
methylhexahydro-1H-azepine-1-carboxylic-3-chloro-4-bromophenyl-amide; and
methylhexahydro-1H-azepine-1-carboxylic-3,4-dichlorophenylamide.

EXAMPLE 4

90 parts by weight of compound I is mixed with 10 parts by weight of N-methyl-α-pyrrolidone. A mixture is obtained which is suitable for application in the form of very fine drops.

EXAMPLE 5

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound I is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of compound II is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of compound III is intimately mixed with 97 parts by weight of particulate kaolin. A dust is obtained containing 3% by weight of the active ingredient.

EXAMPLE 10

30 been sprayed parts by weight of compound I is intimately mixed with a mixture consisting of 92 parts by weight of powdered silica gel and 8 parts by weight of paraffin oil which has beensprayed onto the surface of this silica gel. A formulation of the active ingredient is obtained having good adherence.

We claim:
1. Methylhexahydro-1H-azepine-1-carboxylic-p-fluorophenylamide.
2. Methylhexahydro-1H-azepine-1-carboxylic-m-methylphenylamide.
3. Methylhexahydro-1H-azepine-1-carboxylic-m-trifluoromethyl-phenylamide.
4. Methylhexahydro-1H-azepine-1-carboxylic-3-chloro-4-methyl-thiophenylamide.
5. Methylhexahydro-1H-azepine-1-carboxylic-3-chloro-4-methoxy-phenylamide.

* * * * *

UNITED STATES PATENT OFFICE
CERTIFICATE OF CORRECTION

Patent No. 3,755,298　　　　　Dated August 28, 1973

Inventor(s) Adolf Fischer et al.

It is certified that error appears in the above-identified patent and that said Letters Patent are hereby corrected as shown below:

First page, left-hand column, please correct address of Assignee
-- 75 Assignee: Badische Anilin- & Soda-Fabrik Aktiengesellschaft, Ludwigshafen/Rhein, Germany --;

Column 1, Line 24-25, Delete "or hydrogen";

Column 2, line 23, "troup" should read -- group --.

Column 3, line 4, "Laminum" should read -- Lamium --.

Column 3, line 10, "trivalis" should read -- trivialis --.

Column 3, line 27, column 1, "III" should read -- I --.

Column 3, line 27, column 2, insert -- II --.

Column 3, line 28, column 1, "05" should read -- 5 --.

Column 3, line 28, column 2, insert -- 0 --.

Column 4, line 46, delete "been sprayed ".

Column 4, line 48, "beensprayed" should read -- been sprayed --.

Signed and sealed this 5th day of November 1974.

(SEAL)
Attest;

McCOY M. GIBSON JR.　　　　　　　　　C. MARSHALL DANN
Attesting Officer　　　　　　　　　　　Commissioner of Patents